(12) United States Patent
Levine

(10) Patent No.: US 12,449,836 B2
(45) Date of Patent: Oct. 21, 2025

(54) ACCESSORY DISPLAY DEVICE

(71) Applicant: Xebec, Inc., Austin, TX (US)

(72) Inventor: Alex Cole Levine, Austin, TX (US)

( * ) Notice: Subject to any disclaimer, the term of this patent is extended or adjusted under 35 U.S.C. 154(b) by 0 days.

(21) Appl. No.: 18/670,255

(22) Filed: May 21, 2024

(65) Prior Publication Data

US 2024/0310871 A1    Sep. 19, 2024

Related U.S. Application Data

(63) Continuation of application No. 18/157,074, filed on Jan. 20, 2023, now Pat. No. 12,093,076, which is a continuation of application No. 17/074,632, filed on Oct. 20, 2020, now Pat. No. 11,573,596, which is a continuation-in-part of application No. 16/673,920, filed on Nov. 4, 2019, now Pat. No. 10,809,762.

(51) Int. Cl.
G06F 1/16    (2006.01)

(52) U.S. Cl.
CPC .......... G06F 1/1607 (2013.01); G06F 1/1616 (2013.01); G06F 1/1632 (2013.01)

(58) Field of Classification Search
CPC combination set(s) only.
See application file for complete search history.

(56) References Cited

U.S. PATENT DOCUMENTS

| | | | |
|---|---|---|---|
| 1,936,558 A | 11/1933 | Meyers | |
| 5,035,392 A | 7/1991 | Gross et al. | |
| 5,768,096 A | 6/1998 | Williams et al. | |
| 6,151,401 A | 11/2000 | Annaratone | |
| 6,222,507 B1 | 4/2001 | Gouko | |
| D449,302 S | 10/2001 | Jung | |
| 6,302,612 B1 | 10/2001 | Fowler et al. | |
| 6,532,146 B1 * | 3/2003 | Duquette | G06F 1/1607 361/679.04 |
| 6,643,124 B1 | 11/2003 | Wilk | |
| 6,667,877 B2 * | 12/2003 | Duquette | G06F 1/1677 361/679.04 |
| 6,794,798 B2 | 9/2004 | Watanabe et al. | |
| 6,859,219 B1 | 2/2005 | Sall | |
| 6,967,632 B1 | 11/2005 | Minami et al. | |
| D534,214 S | 12/2006 | Marcy et al. | |
| 7,283,353 B1 | 10/2007 | Jordan et al. | |
| 7,375,954 B2 | 5/2008 | Yang | |

(Continued)

FOREIGN PATENT DOCUMENTS

| CN | 304986389 | 1/2019 |
|---|---|---|
| CN | 305087700 S | 3/2019 |

OTHER PUBLICATIONS

U.S. Appl. No. 29/865,807, filed Aug. 13, 2022, Alex Cole Levine.

(Continued)

*Primary Examiner* — Lisa Lea-Edmonds
(74) *Attorney, Agent, or Firm* — Stovall Legal, PLLC; Blake D. Stovall

(57) ABSTRACT

An accessory display device comprises a first portion having a first engagement portion, a first rail, and a first display movable from a stowed position to a use position. The first engagement portion is configured to engage a first lateral side of a primary display device. The accessory display device further comprises a tensioning member coupled to the first portion.

19 Claims, 6 Drawing Sheets

(56) References Cited

U.S. PATENT DOCUMENTS

| | | |
|---|---|---|
| D594,236 S | 6/2009 | Sidiropoulos |
| D599,357 S | 9/2009 | Kaufman |
| 7,633,744 B2 | 12/2009 | Kuhn |
| D615,082 S | 5/2010 | Taichi |
| 7,752,789 B2 | 7/2010 | Sun et al. |
| 7,813,118 B2 | 10/2010 | Burge |
| D630,204 S | 1/2011 | Kovac |
| D630,205 S | 1/2011 | Kovac |
| D630,206 S | 1/2011 | Kovac |
| D630,628 S | 1/2011 | Kovac |
| D634,745 S | 3/2011 | Park et al. |
| 7,936,558 B2 * | 5/2011 | Chang .................. G06F 1/1616 361/679.04 |
| 8,018,715 B2 * | 9/2011 | Chang .................. G06F 1/1647 361/679.04 |
| D652,832 S | 1/2012 | Wu et al. |
| 8,243,471 B2 | 8/2012 | Liang |
| 8,317,146 B2 | 11/2012 | Jung et al. |
| D679,707 S | 4/2013 | Aarrestad et al. |
| D694,754 S | 12/2013 | Nakada |
| 8,842,425 B2 | 9/2014 | Ryu |
| 8,854,278 B2 | 10/2014 | Parker et al. |
| D761,800 S | 7/2016 | Muller |
| 9,393,757 B2 | 7/2016 | Borchardt et al. |
| 9,395,757 B2 | 7/2016 | Relf |
| 9,441,782 B2 | 9/2016 | Funk et al. |
| D770,447 S | 11/2016 | Endo et al. |
| D770,448 S | 11/2016 | Endo et al. |
| 9,523,461 B2 | 12/2016 | Kuan et al. |
| 9,568,952 B2 | 2/2017 | Matzke et al. |
| 9,696,760 B1 | 7/2017 | Zhang |
| D810,079 S | 2/2018 | Boesiger et al. |
| 9,927,839 B2 | 3/2018 | Kummer et al. |
| 10,082,832 B1 * | 9/2018 | Wang .................. G06F 1/1681 |
| 10,168,739 B1 | 1/2019 | Chen |
| D864,958 S | 10/2019 | Yüksek et al. |
| 10,809,762 B1 | 10/2020 | Levine |
| 10,817,020 B1 * | 10/2020 | DeMaio .................. G06F 3/1423 |
| 10,871,801 B2 | 12/2020 | Yao et al. |
| D910,624 S | 2/2021 | Hudgins et al. |
| 10,944,937 B2 | 3/2021 | Pei |
| D920,975 S | 6/2021 | Yao et al. |
| D938,436 S | 12/2021 | Gu |
| 11,209,869 B2 | 12/2021 | Hudgins et al. |
| D956,752 S | 7/2022 | Wang |
| D960,887 S | 8/2022 | Levine |
| D962,222 S | 8/2022 | Leung et al. |
| 11,416,024 B2 * | 8/2022 | Bryant .................. G06F 1/1632 |
| 11,573,596 B2 | 2/2023 | Levine |
| 2003/0095373 A1 * | 5/2003 | Duquette .............. G06F 1/1683 361/679.04 |
| 2005/0006331 A1 | 1/2005 | Engel |
| 2005/0237699 A1 | 10/2005 | Carroll |
| 2005/0253775 A1 | 11/2005 | Stewart |
| 2006/0059751 A1 | 3/2006 | Chen et al. |
| 2006/0082518 A1 | 4/2006 | Ram |
| 2007/0247798 A1 | 10/2007 | Scott |
| 2008/0198096 A1 | 8/2008 | Jung |
| 2009/0102744 A1 | 4/2009 | Ram |
| 2009/0201222 A1 | 8/2009 | Damian |
| 2010/0039350 A1 | 2/2010 | Wakefield et al. |
| 2010/0053027 A1 | 3/2010 | Tonnison et al. |
| 2010/0124006 A1 * | 5/2010 | Chang .................. G06F 1/1624 361/679.04 |
| 2011/0019360 A1 | 1/2011 | Thabit |
| 2011/0155868 A1 | 6/2011 | Sun et al. |
| 2012/0223872 A1 | 9/2012 | Ram |
| 2012/0280603 A1 | 11/2012 | Hsu et al. |
| 2013/0077213 A1 | 3/2013 | Kao et al. |
| 2015/0212546 A1 | 7/2015 | Ram |
| 2015/0378393 A1 | 12/2015 | Erad et al. |
| 2016/0154434 A1 | 6/2016 | Lakhani |
| 2017/0003712 A1 | 1/2017 | Funk et al. |
| 2019/0018453 A1 * | 1/2019 | Rhodes .................. G06F 1/1647 |
| 2020/0278722 A1 | 9/2020 | Hudgins et al. |
| 2020/0333843 A1 * | 10/2020 | Yao .................. G06F 1/1622 |
| 2021/0080999 A1 * | 3/2021 | Bryant .................. G06F 1/1641 |
| 2021/0134130 A1 | 5/2021 | Kiani et al. |
| 2021/0405702 A1 | 12/2021 | Hudgins et al. |
| 2022/0075421 A1 | 3/2022 | Hudgins et al. |
| 2022/0107669 A1 | 4/2022 | Emam |
| 2023/0152846 A1 | 5/2023 | Levine |
| 2023/0152847 A1 | 5/2023 | Levine |
| 2024/0310871 A1 * | 9/2024 | Levine .................. G06F 1/1647 |

OTHER PUBLICATIONS

"DUEX", https://www.mobilepixels.us/products/duex as viewed Nov. 13, 2019, United States.

"Sidetrak", https://sidetrak.com as viewed Nov. 14, 2019, United States.

"Slidenjoy—Le Slide", https://yourslide.com as viewed Nov. 13, 2019, United States.

* cited by examiner

ACCESSORY DISPLAY DEVICE

CROSS-REFERENCE TO RELATED APPLICATIONS

This application claims the priority benefit of United States of America patent application Ser. No. 18/157,074, filed Jan. 20, 2023, which claims the priority benefit of United States of America patent application Ser. No. 17/074,632, filed Oct. 20, 2020 and issued Feb. 7, 2023 as United States of America U.S. Pat. No. 11,573,596, which claims the priority benefit of United States of America patent application Ser. No. 16/673,920, filed Nov. 4, 2019 and issued Oct. 20, 2020 as United States of America U.S. Pat. No. 10,809,762.

BACKGROUND OF THE INVENTION

Laptop computers have been a huge benefit for people who like to have the ability of a personal computer wherever they are. Whether it be for work, study, or entertainment, the portability of laptop computers has been very advantageous. However, the tradeoff for laptop computers portability has always been the size of the display screen. The bigger the display, the bigger the laptop computer and the less portable it becomes. Therefore, there is a need for a device which allows for the laptop computer display to be expanded. There is also a need for a device that allows for the laptop computer display to be expanded and may be added onto the laptop computer easily and is also compact and portable.

SUMMARY OF THE INVENTION

An example embodiment relates to an accessory display device for a computer. The device includes a first portion having a first engagement portion, a first rail, and a first display movable from a stowed position to a use position. The first engagement portion is configured to engage a lateral side of a primary display device. The device further includes a tensioning member coupled to the first portion Another example embodiment relates to an accessory display device for a computer. The device includes a first portion having a first rail, a first engagement portion, and a first display. The device further includes a second portion having a second rail, a second engagement portion, and a second display. The device further includes a tensioning member coupled to the first portion and the second portion. The tensioning member is configured to pull the first portion and the second portion towards each other.

Another example embodiment relates to an accessory display device for a computer. The device includes a first portion having a first set of one or more rails and a first engagement portion. The device further includes a second portion having a second set of one or more rails and a second engagement portion. The device further includes a tensioning member coupled to the first portion and the second portion. The first set of one or more rails and the second set of one or more rails are configured to allow the system to be coupled to primary display devices of varying widths. The tensioning member is configured to pull the first portion and the second portion toward each other.

In addition to the foregoing, other aspects are described in the claims, drawings, and text forming a part of the disclosure set forth herein. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF DRAWINGS

The use of the same symbols in different drawings typically indicates similar or identical items unless context dictates otherwise.

DETAILED DESCRIPTION OF THE INVENTION

Figure 1:
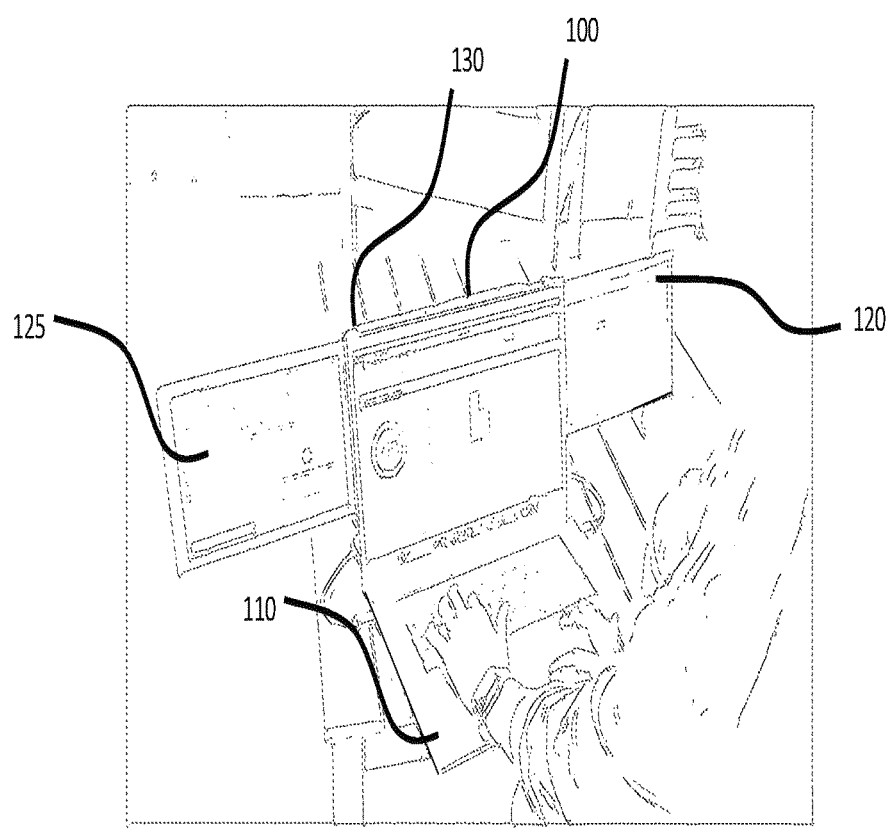
FIG. 1 is a depiction of an accessory display device for a laptop computer in accordance with an example embodiment.

Referring to FIG. 1, a computer display accessory 100 is depicted coupled to a laptop computer 110. Computer display accessory 100 is not limited to laptop computers but may be used on any type of display device including but not limited to tablets, e-readers, gaming devices, desktop displays, television displays, etc. Therefore, computer display accessory 100 is not limited to computers and in fact may be utilized on any type of display. Computer display accessory 100 adds two additional displays 120 and 125 to any existing display. Computer display accessory 100 expands the screen display real estate with two slidable screens that pull out from the back edges of a housing 130. Housing 130 itself is universal, fitting laptops of all sizes and uses tension from elastic to tighten around the edges of the laptop screen.

Figure 2:
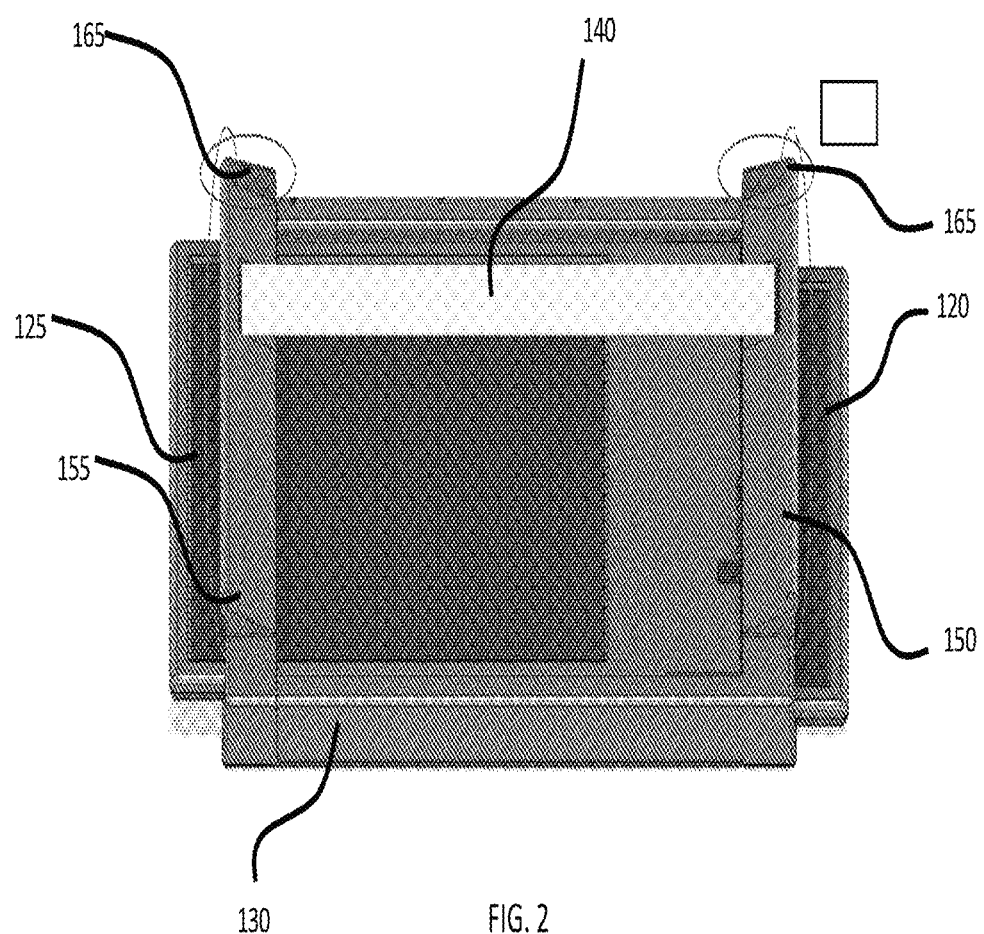
FIG. 2 is an example embodiment of the accessory display device of FIG. 1 removed from the laptop computer.

Referring to FIG. 2, housing 130 includes a mechanism that allows the screens to engage with the lid of the computer display accessory 100 and to pull out from either side. Housing 130 uses an elastic band 140 or other tensioning member to create tension between a right frame clip 150 and a left frame clip 155 which creates force when pulled apart to put on the lid, effectively clamping either side to the computer lid. There is also a lip 160 on the top of right frame clip 150 and a lip 165 on the top of left frame clip 155. The lip helps to further secure computer display accessory 100 on the top of laptop computer 110 display and helps further secure computer display accessory 100 to laptop computer 110. When a user pulls apart the left and right sides of housing 130, an increasing tension is created in the elastic band 140 forcing either side back towards each other. This is what creates the "clamping" effect of the right frame clip 150 and the left frame clip 155.

In accordance with an example embodiment, elastic band 140 may be replaced with any type of suitable tensioning member, including but not limited to a spring, a rubber band, resilient plastic portions, etc. These tensioning members may be coupled to housing portions 170 and 175 in any of a variety of ways including but not limited to with glue, by melting, by tying or sewing, by clipping, etc. In one example, the elastic band 140 may be threaded through a cutout on each portion of housing 130. Once threaded through the cutout, a blocking piece which does not fit through the cutout is affixed to the band so the band does not slip back through the cutout and maintains tension on the band. Any of a variety of ways may be used to attach the tensioning member to the two housing portions without departing from the scope of the invention.

Figure 3:
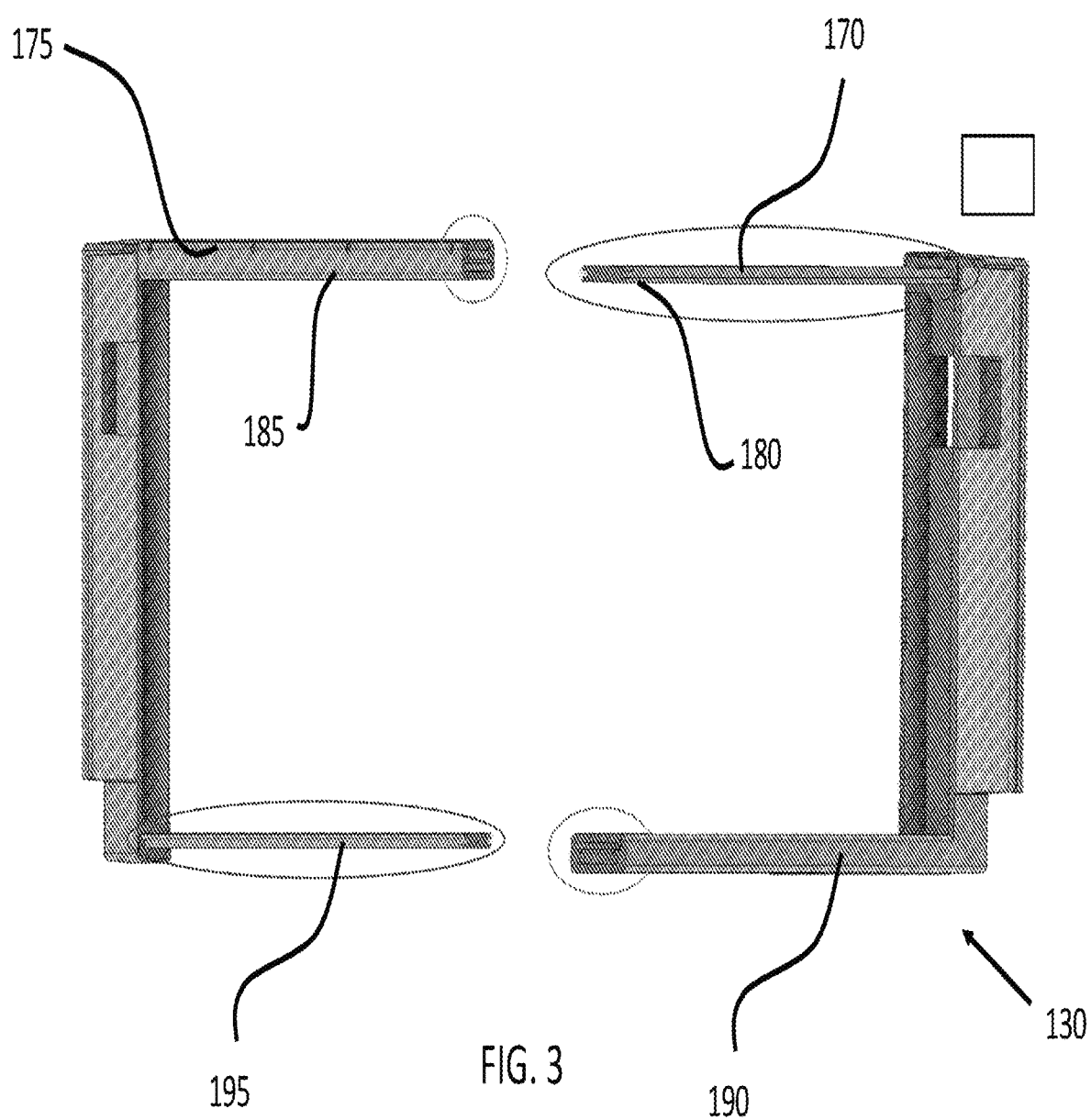
FIG. 3 is an example embodiment of the housing accessory display device of FIG. 1 in an exploded view.

Referring now to FIG. 3, the main part of housing 130 is shown as an exploded view of the two primary portions, right portion 170 and left portion 175. Right portion 170 includes an upper rail 180 and a lower rail 190. Likewise, left portion 175 includes an upper rail 185 and a lower rail 195. Upper rail 185 comprises a hollow female rail while upper rail 180 acts as a male rail complementary to rail 185 and slidable within rail 185. Lower rail 190 comprises a hollow female rail while lower rail 195 acts as a male rail complementary to rail 190 and slidable within rail 190. This design allows for housing 130 to be expandable to clamp onto virtually any size and type of display housing.

Once housing 130 is affixed to a computer or other display, a user may pull either or both of two displays 120 and 125 from a stowed position to a use position as depicted in FIG. 1.

Figures 4, 5:
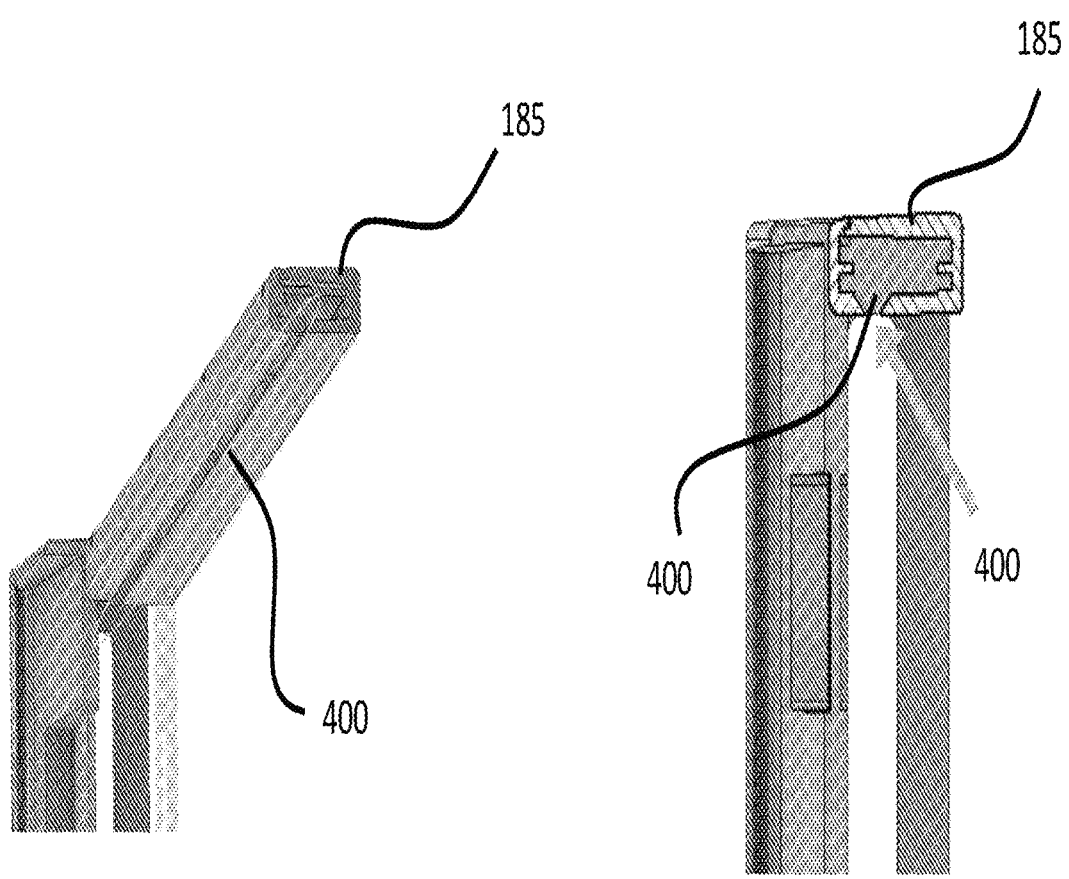
FIG. 4 is an example embodiment of a female rail of the housing.
FIG. 5 is an example cross-sectional view of the female rail of FIG. 4.
Figures 6, 7:
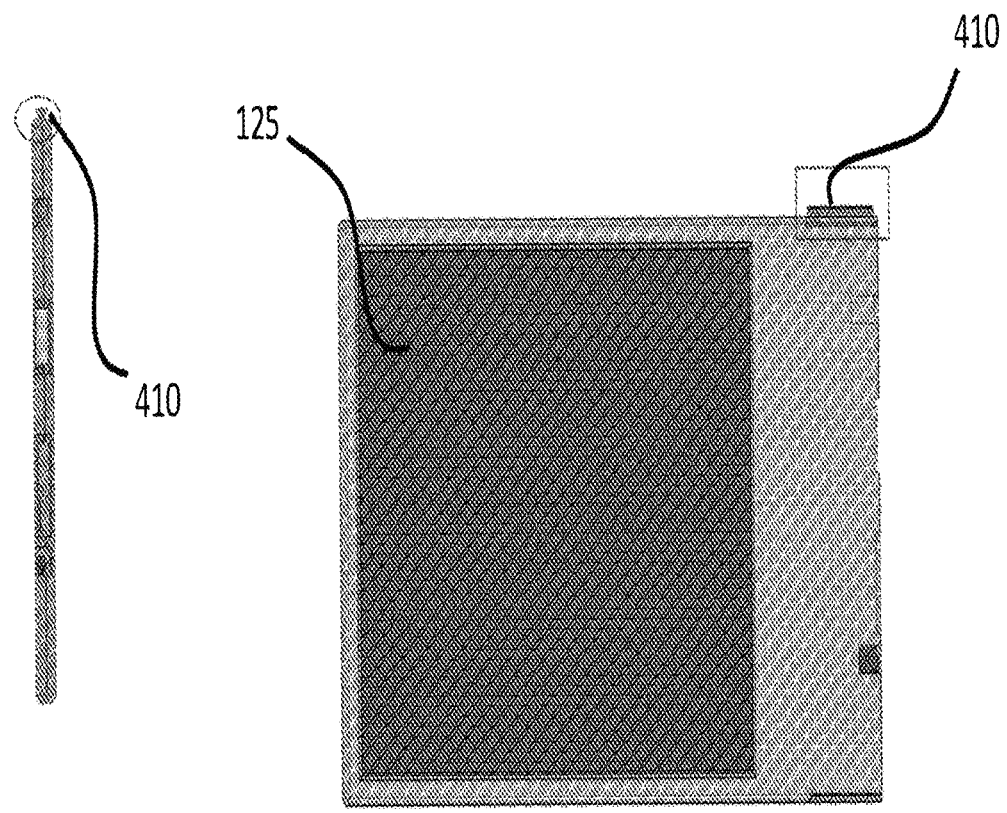
FIG. 6 is an example embodiment of a side view of a display showing a rail guide.
FIG. 7 is an example embodiment of a front view of the display of FIG. 6 showing a rail guide.

Referring now to FIG. 4, a triangular notch on the female sides of upper rail 185 and also lower rail 190 which are both the female rails, act to engage a triangular guiding slide 410 as depicted in FIG. 6 and FIG. 7 for display 125. Likewise, a triangular guiding slide is on the bottom edge of display 120. The cross-sectional view depicted in FIG. 6 shows how the triangular guiding slide 410 interfaces with the triangular notch 400.

Triangular guiding slide 410 also serves as a stopper to prevent the screen from falling out of rail 185 as display 125 is extended. Triangular guiding slide 410 also acts as a stopper on the other end of female rail 185 so that display 125 doesn't fall out the rail internally when display 125 is stowed.

Figure 8:
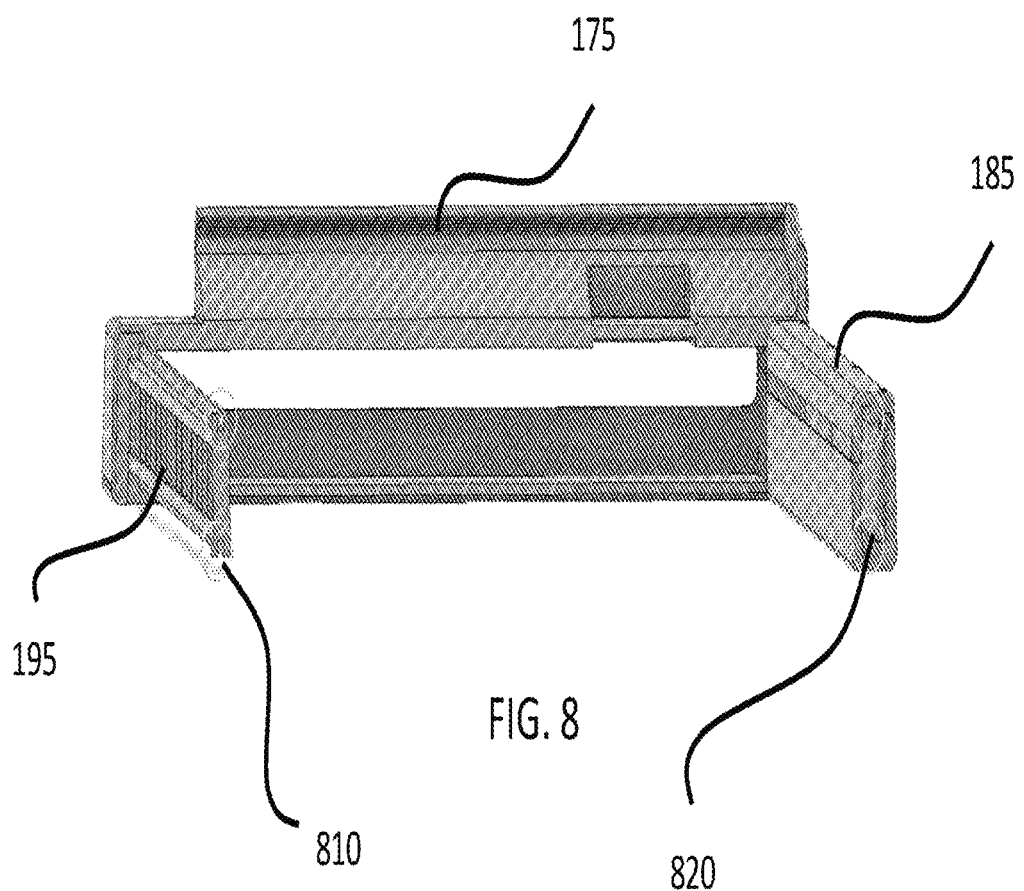
FIG. 8 is an example embodiment of a perspective end view of the left side housing portion.

Referring now to FIG. 8, an end view of the rails 185 and 195 of the left portion 175 of the housing 130 is depicted. Male rail 195 includes two guides that run along the length of rail 195. Guides 810 engage with female rail 190 which has a female cross-section similar to the female cross-section of rail 185. Rail 185 is depicted with a pair of opposing notches 820 that run along rail 185 and are configured to engage guides on male rail 180 like guides 810 of rail 195. The use of a combination of guides and complementary notches on rails 185 and 180 and similarly rails 195 and 190 allows for accurate sliding engagement of the two portions 170 and 175 of housing 130. The rail-to-rail engagement depicted is one example of an arrangement to enable expandability of housing 130 however any of a variety of other ways may be used without departing from the scope of the invention.

It should be noted that the device described may be formed of a number of different materials and formed in a variety of shapes without departing from the scope of the invention. Also, it should be noted that embodiments of the accessory device are designed to couple to the display device, such as but not limited to a laptop computer display, in a manner that is secure enough to carry the laptop computer with the accessory device attached thereto. In this way the portability of a device, such as a laptop computer is not compromised.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. An accessory display device comprising:
   a first portion having a first engagement portion, a first rail, and a first display movable from a stowed position to a use position, wherein the first engagement portion is configured to engage a first lateral side of a primary display device; and
   a tensioning member coupled to the first portion, wherein the first engagement portion is configured to engage the first lateral side of the primary display device under force generated by the tensioning member.

2. The accessory display device of claim 1, wherein the first engagement portion comprises a frame clip having a vertical portion configured to engage the first lateral side of the primary display device and having a lip portion configured to engage a top side of the primary display device.

3. The accessory display device of claim 1, wherein the first rail is a female rail and includes a plurality of notches configured to engage one or more mating components.

4. The accessory display device of claim 3, wherein a first notch of the plurality of notches is configured to engage a corresponding guide on a second rail and a second notch of the plurality of notches is configured to engage a corresponding guide on the first display.

5. The accessory display device of claim 1, wherein the first rail is a male rail and includes one or more guides configured to engage one or more mating components.

6. The accessory display device of claim 5, wherein the one or more guides are configured to engage a one or more corresponding notches on a second rail.

7. The accessory display device of claim 1 wherein the first portion further comprises a second rail, wherein the first rail is a female rail is the second rail is a male rail.

8. The accessory display device of claim 1, further comprising a second portion having a second engagement portion configured to engage a second lateral side of the display device, a second rail, and a second display movable from a stowed position to a use position, wherein the tensioning member is coupled to the second portion, wherein the first rail is configured to be slidably engaged with the second rail.

9. An accessory display device comprising:
   a first portion having a first rail, a first engagement portion, and a first display;
   a second portion having a second rail, a second engagement portion, and a second display; and
   a tensioning member coupled to the first portion and the second portion, wherein the tensioning member is configured to pull the first portion and the second portion towards each other.

10. The accessory display device of claim 9, wherein the first rail and the second rail are configured to be slidably engaged.

11. The accessory display device of claim 10, wherein the first rail comprises at least one guide and the second rail comprises at least one notch, wherein the first rail and the second rail being configured to be slidably engaged comprises the at least one notch being configured to mate with the at least one guide.

12. The accessory display device of claim 9, wherein the first engagement portion comprises a first frame clip and the second engagement portion comprises a second frame clip, wherein the first frame clip is configured to engage a first side of a primary display and the second frame clip is configured to engage a second side of the primary display.

13. The accessory display device of claim 12, wherein the first frame clip includes a first lip configured to engage a top side of the primary display and the second frame clip includes a second lip configured to engage the top side of the primary display.

14. The accessory display device of claim 9, wherein the first display and the second display are individually movable from a stowed position to a use position.

15. The accessory display device of claim 9, wherein the first engagement portion comprises a first cutout and the engagement portion comprises a second cutout, wherein the tensioning member is inserted through the first cutout and the second cutout and secured via a blocking piece affixed to the tensioning member.

16. A system comprising:
   a first portion having a first set of one or more rails and a first engagement portion;
   a second portion having a second set of one or more rails and a second engagement portion; and
   a tensioning member coupled to the first portion and the second portion;
   wherein the first set of one or more rails and the second set of one or more rails are configured to allow the system to be coupled to primary display devices of varying widths; and
   wherein the tensioning member is configured to pull the first portion and the second portion toward each other.

17. The system of claim 16, further comprising:
   a first display coupled to the first portion, wherein the first display is movable between a first stowed position and a first use position; and
   a second display coupled to the second portion, wherein the second display is movable between a second stowed position and a second use position.

18. The system of claim 17, wherein the first display being movable between the first stowed position and the first use position comprises the first display being slidable along the first set of one or more rails and wherein the second display being movable between the second stowed position and the second use position comprises the second display being slidable along the second set of one or more rails.

19. The system of claim 16, wherein the first set of one or more rails and the second set of one or more rails being configured to allow the system to be coupled to primary display devices of varying widths comprises the first set of one or more rails being slidably engaged with the second set of one or more rails.

* * * * *